(12) United States Patent
Lanter

(10) Patent No.: US 8,635,918 B2
(45) Date of Patent: Jan. 28, 2014

(54) BELT TENSION MONITOR

(75) Inventor: Joshua Lanter, Chur (CH)

(73) Assignee: PolyContact AG, Chur (CH)

( * ) Notice: Subject to any disclaimer, the term of this patent is extended or adjusted under 35 U.S.C. 154(b) by 342 days.

(21) Appl. No.: 13/050,066

(22) Filed: Mar. 17, 2011

(65) Prior Publication Data

US 2012/0060629 A1  Mar. 15, 2012

(30) Foreign Application Priority Data

Mar. 19, 2010  (EP) .................................... 10157106

(51) Int. Cl.
*G01L 1/04* (2006.01)
*G01L 5/04* (2006.01)

(52) U.S. Cl.
USPC ............. 73/862.453; 73/862.451; 73/862.391

(58) Field of Classification Search
USPC ....................... 73/862.453, 862.451, 862.391
See application file for complete search history.

(56) References Cited

U.S. PATENT DOCUMENTS

| 5,965,827 | A  | * | 10/1999 | Stanley et al. ........... 73/862.391 |
| 6,959,779 | B2 | * | 11/2005 | Curtis et al. ................... 180/268 |
| 2002/0104383 | A1 | * | 8/2002 | Chamings et al. .............. 73/826 |
| 2008/0195283 | A1 | * | 8/2008 | Hunkeler et al. ............... 701/45 |

FOREIGN PATENT DOCUMENTS

| DE | 24 13 553  | 9/1975 |
| DE | 197 16 134 | 10/1998 |
| DE | 601 10 549 | 1/2006 |
| EP | 1 552 993  | 7/2005 |

* cited by examiner

*Primary Examiner* — Lisa Caputo
*Assistant Examiner* — Jamel Williams
(74) *Attorney, Agent, or Firm* — Fay Kaplun & Marcin, LLP

(57) ABSTRACT

A device for monitoring belt tension includes two supporting elements for supporting a belt, a deflecting element between the supporting elements, at least one elastic element and a switch. A sufficiently high tension for a belt that is supported on the supporting elements and guided past the deflecting element may be displayed if the deflecting element has been moved in a predefined way against a restoring force of the elastic element, thereby actuating the switch.

7 Claims, 7 Drawing Sheets

BELT TENSION MONITOR

REFERENCE TO RELATED APPLICATIONS

This application claims the benefit of the filing date of EP Patent Application Serial No. EP 10 157 101.6 filed 19 Mar. 2010, the disclosure of which is hereby incorporated herein by reference.

AREA OF THE INVENTION

The present invention relates to a device for monitoring belt tension. The present invention further relates to the use of such a device in a child seat or car seat.

PRIOR ART

Known from EP 1 552 993 B1 is a device for displaying the correct tension for a safety belt, in particular for a child seat. This device encompasses a movable element, which is actively connected with the belt, spring arrangements for acting on the movable elements, which counteracts the action exerted on the belt by the tensile force, as well as displays for providing a signal that indicates the correct tension state of the belt when the movable element has reached a predetermined position. For example, this display is realized in a window, in which a color region of the movable element is visible or still invisible.

SUMMARY OF THE INVENTION

The present invention relates to a device that simplifies the monitoring of belt tension. In general, a device for monitoring belt tension according to the invention comprises a deflecting element and a switch. A sufficiently high level of tension on a belt that is being guided past the deflecting element may be determined according to the invention when the deflecting element is moved in a specific manner against a restoring force.

In other words, a belt tension generates a force that acts on the deflecting element, which counteracts a restoring force, wherein the restoring force is caused by the elasticity of at least one section of the deflecting element, or by a separate elastic element. As soon as the belt tension has reached a desired level, the resultant force will move the deflecting element in a predefined manner, and the movement of the deflecting element will in this case be enough to actuate a switch, which is arranged in a suitable location and then may activate a suitable display.

It is noted that a section of the deflecting element may be elastically deformable, for example, when an elastic element is integrally designed with the deflecting element. Further, the deflecting element itself may exhibit the desired elasticity, so that the deflecting element itself generates the restoring force.

It is further noted that the deflecting element may according to the invention also indirectly actuate a switch, for example when a belt or other element is arranged between the deflecting element and the switch.

In a first exemplary embodiment of the invention, two supporting elements are spaced apart from each other, wherein the deflecting element is situated between the supporting elements. In addition, an elastic element, for example a type of leaf spring, is arranged in such a way that the elastic element joins the deflecting element with the two supporting elements. In other words, the elastic element is secured to the supporting elements, and the deflecting element between the supporting elements may be moved or shifted against the restoring force or spring force, essentially parallel to the supporting elements.

It is noted that the two supporting elements may also be integrally designed. In this case, the supporting elements may comprise a frame, for example, through which the belt is routed and on which the elastic element is supported.

In another variant, only one supporting element may be provided. The elastic element may be supported on this supporting element. For example, an end loop of a belt may in this case be arranged around both elements.

The supporting elements and the deflecting element may be oblong or rod-shaped elements, which essentially are arranged parallel to each other. A belt may run transverse to these oblong elements. An elastic element may be situated at the side of the belt. In other words, the elastic element may be situated parallel next to the belt in a mounted state. Further, two elastic elements may be provided on either side of the belt once the device for monitoring belt tension has been installed.

In a second embodiment of the invention, the deflecting element is pivoted between two supporting elements. The deflecting element may be arranged essentially parallel to the supporting elements here as well. A pivoting motion of the deflecting element may be achieved by articulating the deflecting element, wherein the swivel joint may be arranged in such a way that a belt may run over a longer lever arm of the deflecting element.

The pivoting motion of the deflecting element is pre-tensioned in this embodiment too. Here as well, a switch may be actuated via the deflecting element once the deflecting element has been moved or pivoted in a specific way against a restoring force, for example of an elastic element.

In a third embodiment of the invention, the deflecting element is part of a frame, wherein two laterally opposing legs of the frame are elastic, so that the frame generates a restoring force in response to a deformation. This restoring force may in turn be calibrated so as to correspond to a predefined belt tension.

According to this embodiment, the switch actuatable via the deformation of the frame may be arranged inside the frame, or also laterally outside the frame.

As also described in conjunction with the first embodiment, a supporting element may be provided for supporting an elastic element joined with the deflecting element, wherein the belt may either be deflected transverse to its longitudinal direction, or a loop formed at one end of the belt may be arranged over the deflecting element and around the supporting element.

A device according to one of the embodiments described above may preferably be used for monitoring the belt tension of a vehicle seat, in particular a child seat.

A signal that indicates whether the applied belt tension is high enough or not may be generated in a variety of ways by actuating the switch. For example, a lamp on a child seat may light up when the switch is actuated. On the other hand, a display in the dashboard may be activated via a connection with the vehicle. An acoustic signal is also possible.

Actuating the switch according to the invention may cause an electrical contact to close on the one hand, but also lead to the interruption of an electrical contact on the other hand.

It is also conceivable the presence or absence of a contact activates a belt stiffener, which readjusts the belt tension.

The embodiments and aspects described above, along with other aspects, features and advantages of the invention may also be gleaned from the exemplary embodiments, which are described below with reference to the attached drawings.

DETAILED DESCRIPTION OF THE EMBODIMENTS

Figure 1:
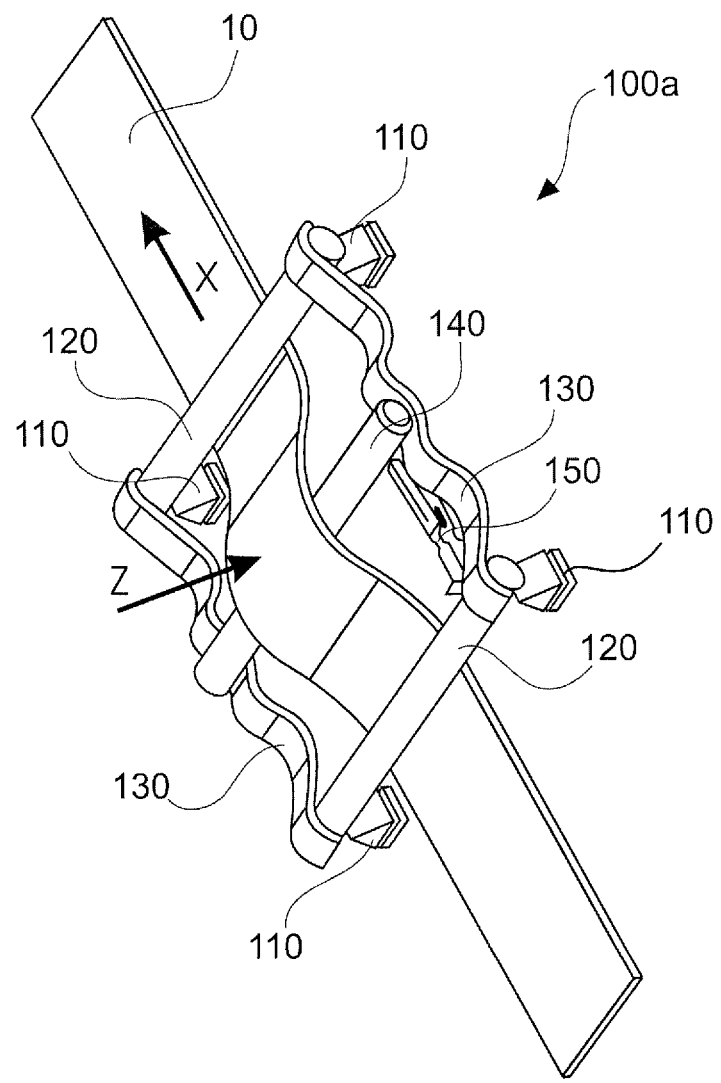
FIG. 1 is an isometric view of a first variant of a device according to the first exemplary embodiment of the present invention.

FIG. 1 shows an exemplary embodiment of a first variant of a device 100a for monitoring belt tension according to a first embodiment of the invention. This device has two supporting elements 120, which are shown being supported on small pyramids 110. The pyramids 110 symbolize fixed mounting points of the supporting elements 120. The two supporting elements 120 are arranged roughly parallel to each other and spaced apart from each other.

In addition, the device comprises two elastic elements 130, which each are each situated essentially parallel next to the belt 10 on the one hand, and between the supporting elements 120 from one end region of the one supporting element to an end region of the other supporting element on the other hand. A deflecting element 140 is provided roughly halfway between the supporting elements 120. A switch 150 is situated under the deflecting element 140 on FIG. 1.

On FIG. 1, a belt 10 is threaded or guided through the device 100, under the supporting elements 120 and over the deflecting element 140. The deflecting element 140 supported on the elastic elements 130 is somewhat elevated, so that the belt 10 is deflected or diverted transverse to its longitudinal direction (at least with a directional component).

As soon as the belt 10 is now exposed to a tension or tensile force in the direction of arrow X, the belt exerts a force on the deflecting element 140 in the direction of arrow Z at the point where the belt is deflected via the deflecting element 140. This force will press the deflecting element 140 in the direction of arrow Z, until the switch 150 is actuated by the deflecting element 140.

It is noted that the individual elements of the device 100 are only shown diagrammatically. The rod-shaped elements 120 and 140 may also be provided with another cross section. The elastic effect of the specially corrugated shape of the depicted leaf springs 130 may also be realized with another configuration.

Figure 2:
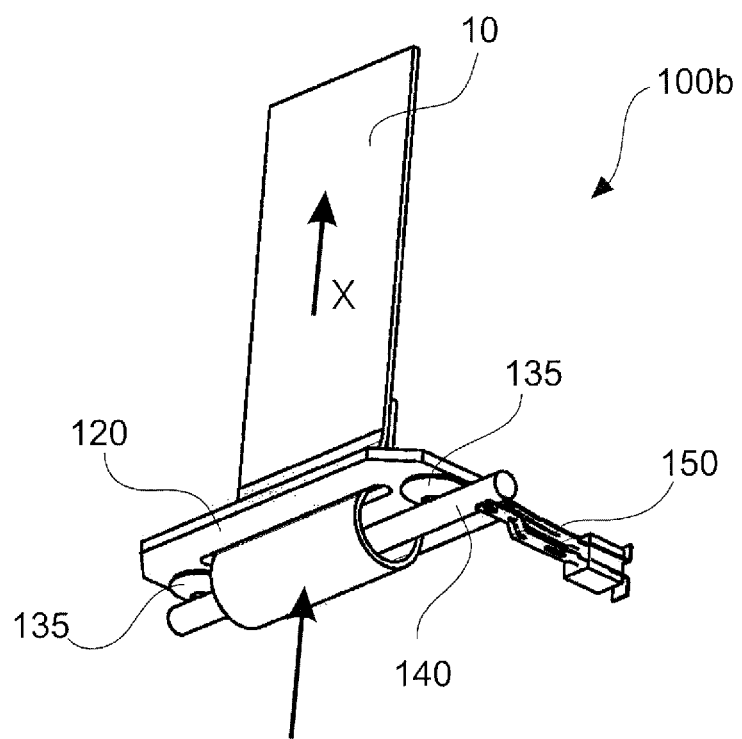
FIG. 2 is an isometric view of a second variant of a device according to the first embodiment of the invention.

FIG. 2 shows an exemplary embodiment of a second variant of a device 100b for monitoring belt tension according to the first embodiment of the invention. This variant differs from the first variant of the first embodiment in that the two supporting elements 120 are integrally designed in the form of a frame, wherein one belt end is guided through the frame, the deflecting element 140 and then back through the frame again.

Accordingly, a tensile force at the belt 10 in the longitudinal direction X acts on the deflecting element 140 in roughly the same direction. As in the first variant, a switch 150 is actuated as soon as the deflecting element 140 is moved against a restoring force of the elastic elements.

A second variant of the first embodiment provides disc springs 135 as the elastic elements.

It is noted that the forms of the elastic elements cited in the variants of the first embodiment are only examples. The intended effect may also be achieved by means of spiral springs, rubber cushions or other suitable spring elements.

Figure 3:
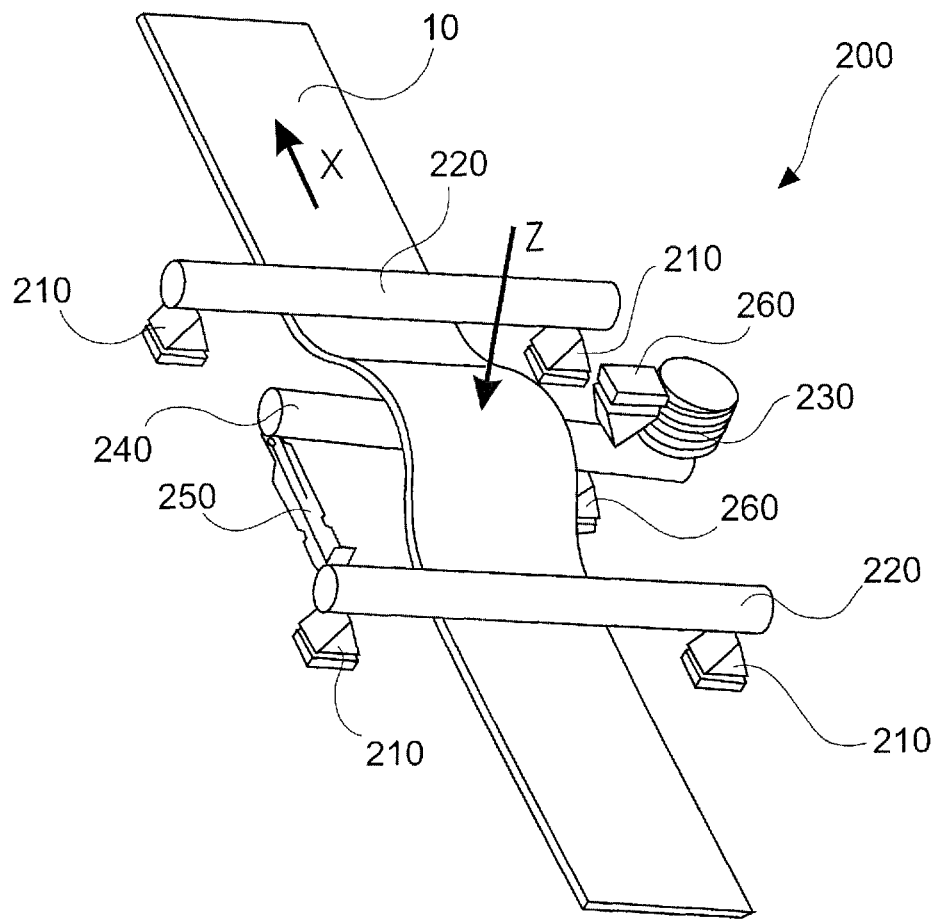
FIG. 3 is an isometric view of a device according to the second exemplary embodiment of the present invention.

FIG. 3 shows a device 200 for monitoring belt tension according to a second embodiment of the invention. As in the first embodiment, a belt 10 is guided under a first supporting element 220, over a deflecting element 240 and then back under a second supporting element 220. The supporting elements 220 are each arranged and fixed at the mounting points 210.

In the second embodiment, the deflecting element 240 is situated between two attachment points in such a way as to form an articulation 260, to which the deflecting element is pivoted. The swiveling axis here runs in roughly the direction of arrow X. The deflecting element 240 is shown as a rod-shaped element, wherein the mounting point is located in proximity to the one end region of the deflecting element 240. The belt 10 is guided over a longer lever arm of the deflecting element 240, and an elastic element 230 is arranged on the shorter lever arm in such a way that the restoring force of the elastic element 230 counteracts the force acting on the longer lever arm as the result of tensioning the belt.

After a predefined belt tension in the direction of arrow X has been achieved, the deflecting element 240 is also pivoted in the direction of arrow Z until a switch 250 is actuated.

It is noted that the elastic element 230 may also be situated on the long lever arm of the deflecting element 240. In addition, the elastic element may be a tension or compression spring. One essential aspect is that the restoring force generated by the elastic element 230 be calibrated in such a way during a pivoting motion of the deflecting element 240 as to correspond roughly to the force exerted by the belt on the deflecting element 240 as the result of tensioning the belt.

Figure 4:
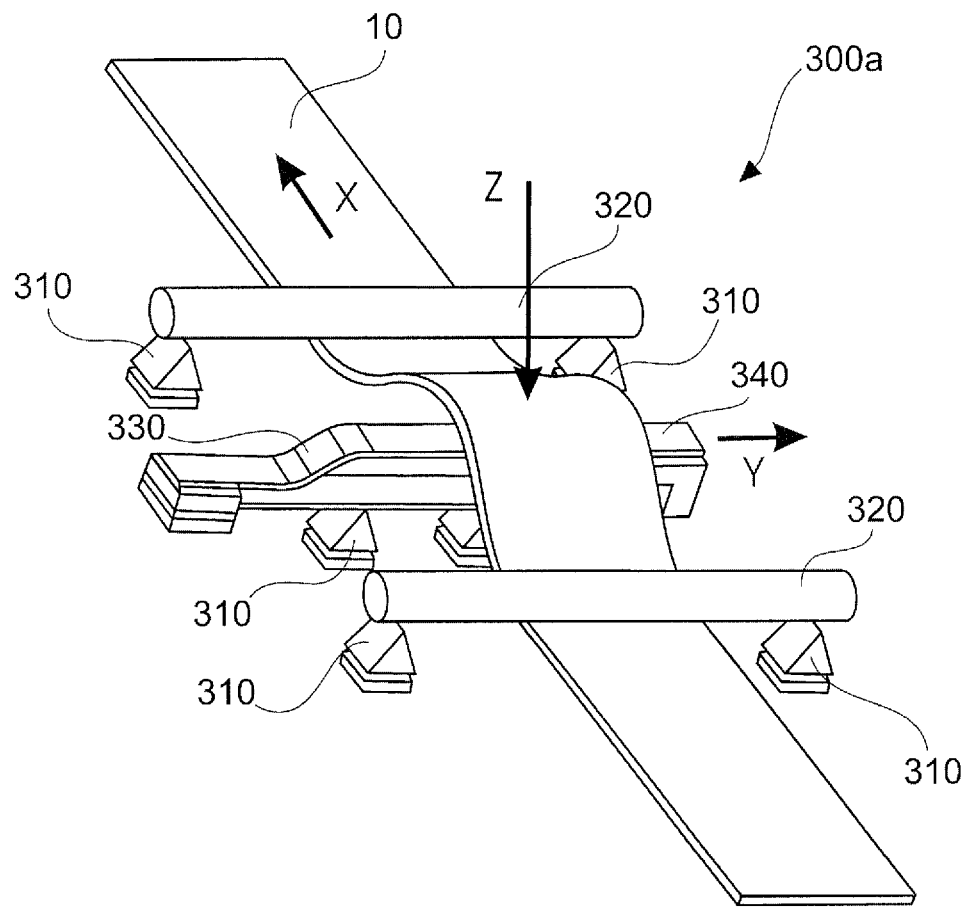
FIG. 4 is an isometric view of a first variant of a device according to the third exemplary embodiment of the present invention.

FIG. 4 shows a first variant of a device 300a for monitoring belt tension according to a third embodiment of the invention. The belt 10 is guided under the supporting elements 320, which are fixed at the mounting points 310, and over the deflecting element 340. This embodiment is distinguished from the preceding embodiments in particular in that the deflecting element is part of a frame, and that the switch is situated inside the frame.

Figure 5:
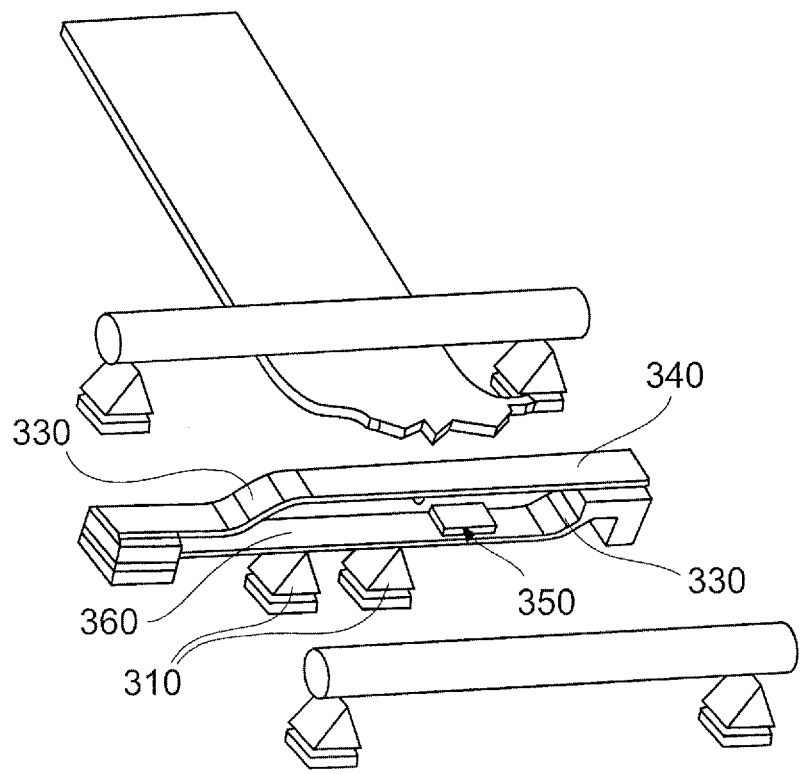
FIG. 5 is a partially cut open view of the device from FIG. 4.

FIG. 5 shows a partially cut open view of the first variant of the device according to the third embodiment. In particular, the frame with the deflecting element 340 is more clearly visible on FIG. 5. The frame has four legs. At the top of FIG. 5, the deflecting element 340 forms a long leg of the frame. Two elastic elements 330 are located to the side as shorter legs. The frame further has a lower leg 360, which is arranged essentially parallel to the upper leg, and which is fixed to the mounting points 310.

In this embodiment, the lateral elastic elements 330 are not perpendicular to the deflecting element 340, but rather situated at an angle of roughly 30-60° (or 120-150°) relative to the deflecting element 340. This inclined arrangement of elastic elements 330 relative to the deflecting element 340 yields a frame shaped like a kind of parallelogram.

The belt 10 guided over the deflecting element 340 exerts a force from above (in the direction of arrow Z) on the deflecting element 340, so that the lateral elastic elements 3340 deform in a Y-Z plane. In other words, the upper deflecting element 340 moves laterally in the direction of arrow Y on the one hand, but also in the direction of arrow Z toward the lower long leg 360. In such an arrangement, a switch 350 lying inside the frame can be actuated when the belt 10 has achieved a desired tensioning level.

Figure 6:
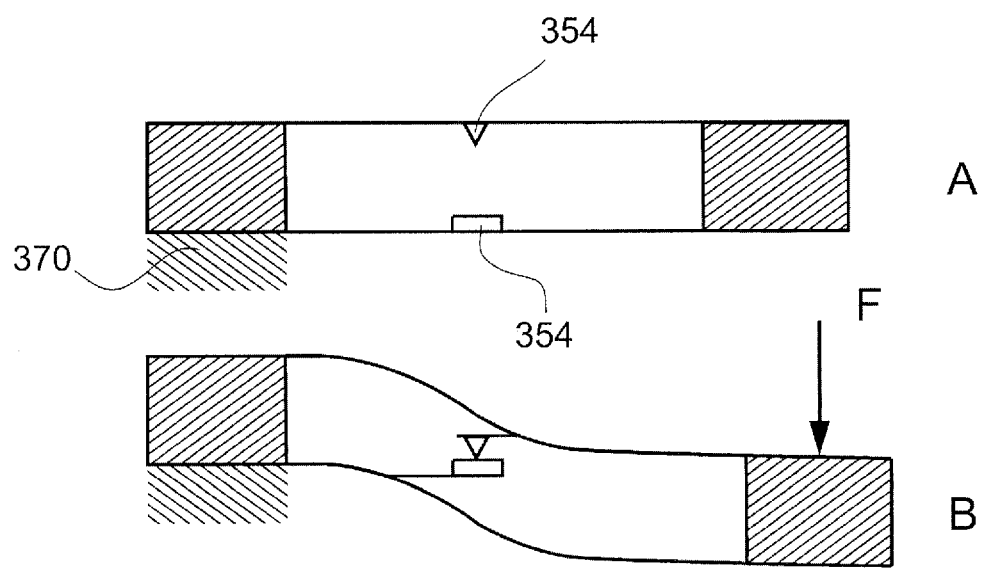
FIG. 6 is a diagrammatic view showing how a deflecting element according to the third embodiment of the invention functions.

FIG. 6 illustrates the deformation of a frame, and hence an actuation of a switch. In the top view A, the frame is fixed on one side, as denoted by a hatched surface 370. The frame in view A is not exposed to a load. In view B, a force F acts on the frame at its unfixed end, causing the legs of the frame to deform, and the switch elements 352 and 354 of the switch to come into contact with each other.

Figure 7:
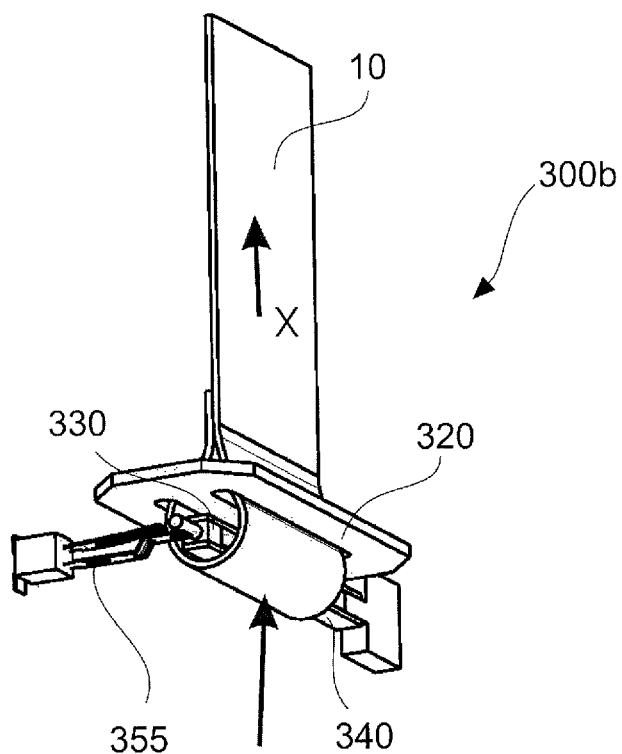
FIG. 7 is an isometric view of a second variant of a device according to the third embodiment of the invention.

FIG. 7 shows a second variant of a device 300b for monitoring belt tension according to a third embodiment of the invention. The belt 10 is guided through a frame-shaped supporting element 320 and over the deflecting element 340. This embodiment differs from the preceding variant in particular in that the switch 355 is arranged outside the frame.

In the second variant of the third embodiment, the deflecting element 340 also forms a leg of a parallelogram.

Figure 8:
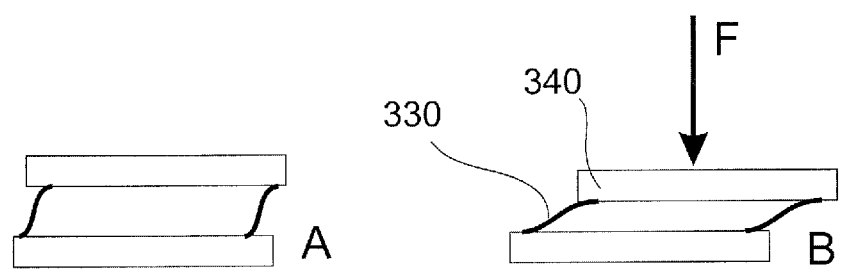
FIG. 8 is a diagrammatic view showing how another deflecting element according to the third embodiment of the invention functions.

In the diagrammatic view on FIG. 8, the leg lying opposite the deflecting element 340 may be viewed as a base, since this leg is fixed to a vehicle seat structure, for example. The frame in view A is not exposed to a load. In view B, a force F acts on the frame, causing the lateral legs 330 of the frame to deform. As a result, the lateral legs are designed as elastic elements that exert a restoring force, which counteracts the tensile force acting on the belt in direction X.

Figure 9:
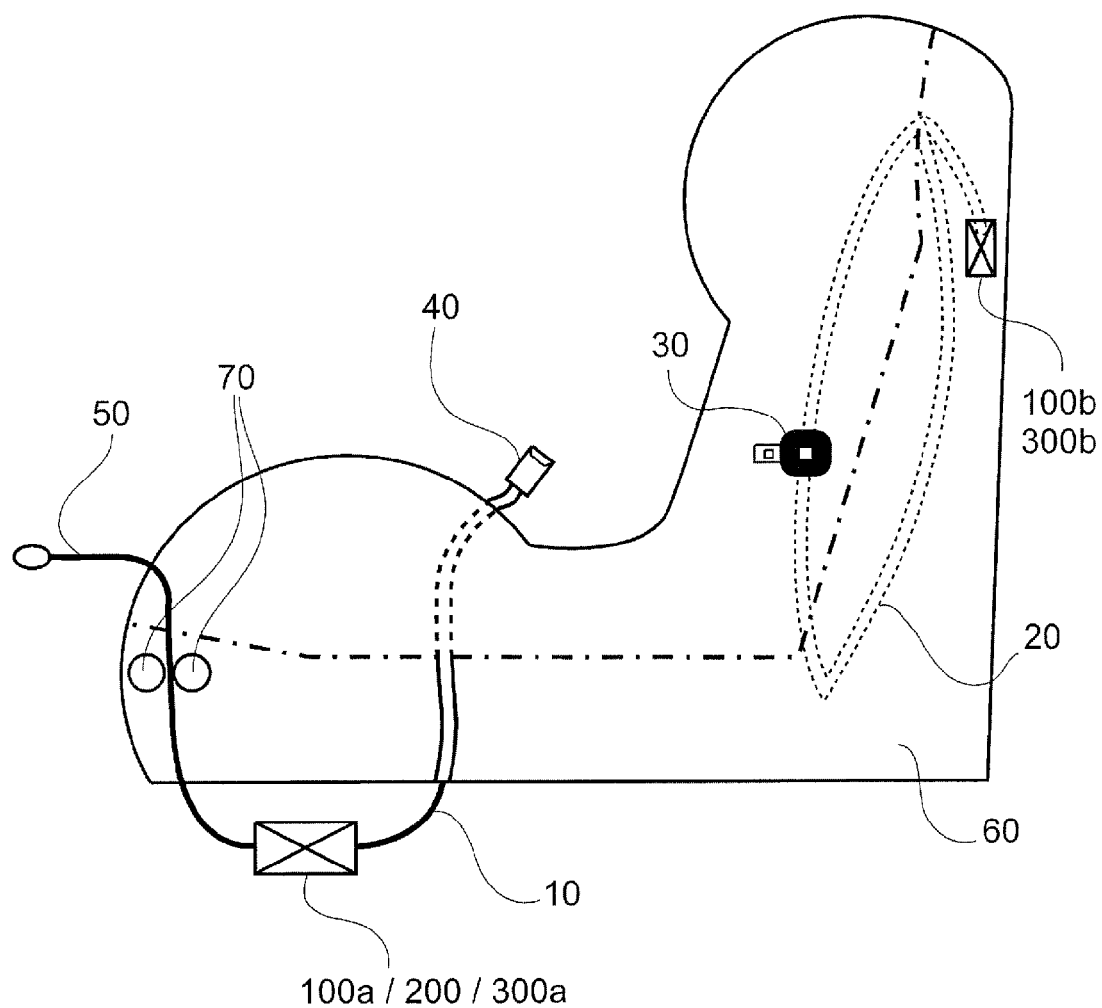
FIG. 9 is a diagrammatic view of a child seat with a device for monitoring belt tension.

FIG. 9 shows an exemplary embodiment of a child seat, in which a device for monitoring belt tension according to the invention is provided. A carrier belt 20 with a tongue insert 30 is integrated into the backrest of the seat 60. The tongue insert may be inserted into a belt buckle 40, which is usually situated between the legs of a child. The belt buckle 40 is arranged at the end of a belt section 10 that extends from the seat at the front as a tensioning loop 50. A return stop 70 prevents the tensioning loop 50 from sliding back into the seat.

For example, one of the devices 100a, 200 or 300a according to the invention described above is arranged on the belt section 10 under the seat contour. As soon as the tongue insert 30 of the carrier belt 20 has been inserted into the belt buckle 40, the tensioning loop 50 can be pulled, and the belt section 10 can be tensioned. Once a sufficiently high tension is present on the belt section 10, the device 100, 200 or 300 will display the sufficient tension level by actuating the switch of the device.

As an alternative, a device according to one of the second variants may be provided at one bent end. A device 100b or 300b is diagrammatically shown here in the backrest.

While the invention was illustrated and described in detail in the drawings and preceding description, such illustrations and descriptions are intended to be illustrative or exemplary only, and not restrictive, so that the invention is not limited by the disclosed embodiments. In the claims, the word "comprising" does not preclude other elements, and the indeterminate article "a" does not rule out a plurality.

Just the mere fact that specific features are mentioned in various dependent claims does not limit the subject matter of the invention. Combinations of these features can also be advantageously used. The reference numbers in the claims are not intended to limit the scope of the claims.

REFERENCE LIST

10 Belt section
20 Carrier belt
30 Tongue insert
40 Belt buckle
50 Tensioning loop
60 Child seat
70 Return stop
100, 200, 300 Device according to the invention
110, 210, 310 Mounting point
120, 220, 320 Supporting element
130, 135, 230, 330 Elastic element
140, 240, 340 Deflecting element
150, 250, 350, 355 Switch
260 Articulation
352, 354 Switch elements
360 Fixed leg
370 Hatched surface

The invention claimed is:

1. A device for monitoring belt tension, comprising:
a deflecting element which is movable against a restoring force;
at least two supporting elements supporting a belt, the supporting elements being spaced apart from each other, the deflecting element being arranged between the supporting elements;
at least two elastic elements which join the deflecting element with the supporting elements, each of the elastic elements supporting an end region of the deflecting element, so that the deflecting element is movable parallel to the supporting elements; and
a switch actuatable via the deflecting element,
wherein the belt is arrangable in such a way as to be deflected by the deflecting element, and wherein tensioning the belt then causes the deflecting element to move against the restoring force, and the switch is actuated when the deflecting element is moved a predefined distance against the restoring force.

2. The device according to claim 1, wherein the at least one supporting element and the deflecting element are oblong elements, which are situated parallel to each other.

3. The device according to claim 1, wherein the deflecting element together with the elastic elements forms a frame shaped like a parallelogram.

4. A device for monitoring belt tension, comprising:
a deflecting element which is movable against a restoring force;
at least one supporting element supporting a belt, the supporting element being spaced a distance apart from the deflecting element;
at least two elastic elements which join the deflecting element with the supporting elements, each of the elastic elements supporting an end region of the deflecting element, so that the deflecting element is movable parallel to the supporting elements; and
a switch actuatable via the deflecting element,
wherein the belt is arrangable in such a way as to be deflected by the deflecting element, and wherein tensioning the belt then causes the deflecting element to move against the restoring force, and the switch is actuated when the deflecting element is moved a predefined distance against the restoring force.

5. The device according to claim 4, wherein the at least one supporting element and the deflecting element are oblong elements, which are situated parallel to each other.

6. The device according to claim 4, wherein the deflecting element together with the elastic elements forms a frame shaped like a parallelogram.

7. Use of a device for monitoring a belt of a vehicle seat, wherein the device comprises:
- a deflecting element which is movable against a restoring force;
- at least two supporting elements supporting a belt, the supporting elements being spaced apart from each other, the deflecting element being arranged between the supporting elements;
- at least two elastic elements which join the deflecting element with the supporting elements, each of the elastic elements supporting an end region of the deflecting element, so that the deflecting element is movable parallel to the supporting elements; and
- a switch actuatable via the deflecting element,
- wherein a belt is arrangable in such a way as to be deflected by the deflecting element, and wherein tensioning the belt then causes the deflecting element to move against the restoring force, and the switch is actuated when the deflecting element is moved a predefined distance against the restoring force.

* * * * *